Aug. 28, 1956 — H. E. LIEN — 2,760,700
FISH STRINGER
Filed Aug. 16, 1954
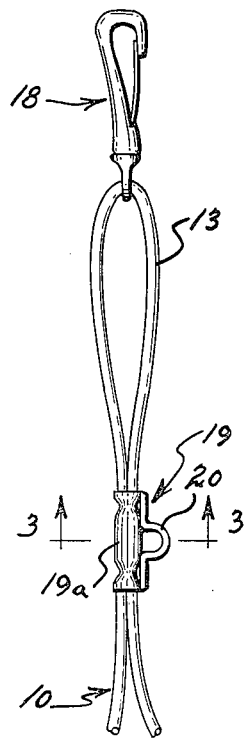
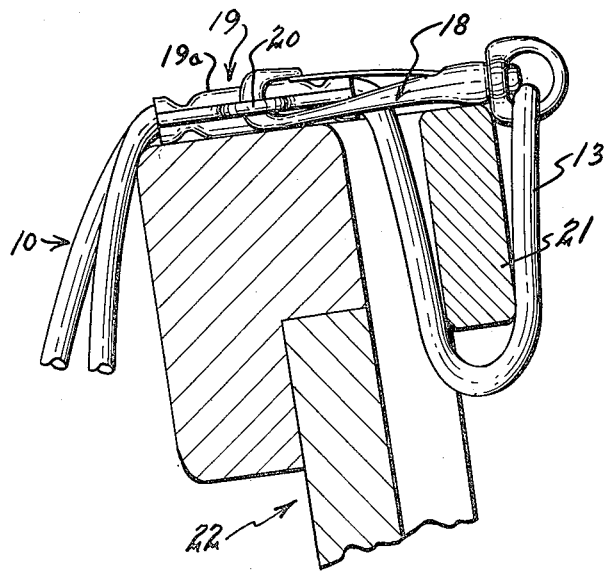
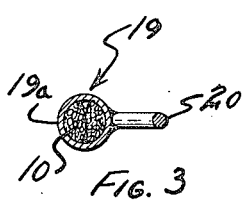
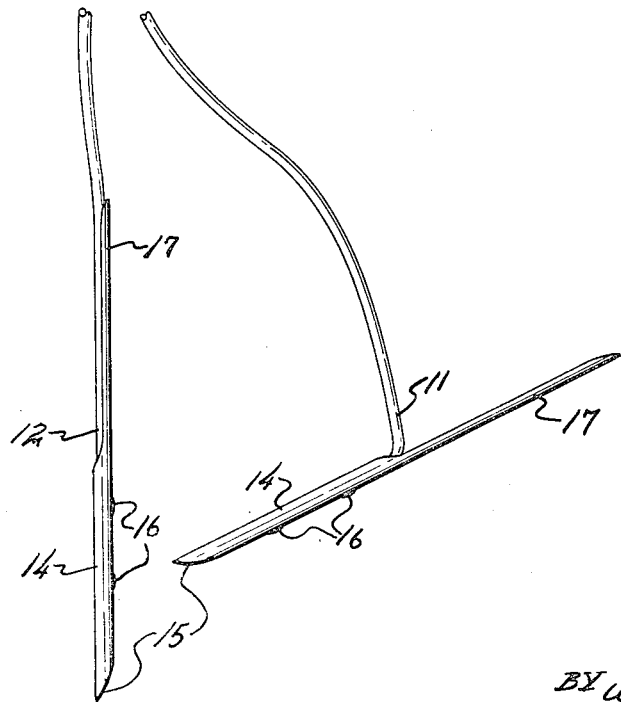
INVENTOR
HAROLD E. LIEN
BY Williamson, Williamson,
Schroeder & Adams
ATTORNEYS United States Patent Office 2,760,700
Patented Aug. 28, 1956

2,760,700

FISH STRINGER

Harold E. Lien, St. Paul, Minn.

Application August 16, 1954, Serial No. 450,038

3 Claims. (Cl. 224—7)

This invention relates to a fish stringer and has as an important object thereof the provision for a simple and inexpensive device for retaining a large number of freshly caught fish in safe and secure position underneath the water.

A number of fish stringing devices have been proposed with numerous safety features to prevent fish from coming free from the stringer and escaping after having once been caught by an angler. These devices are largely adapted to be secured to a boat or a dock with the free end thereof extending into the water for carrying fish and maintaining the freshly caught fish in live condition until removed for cleaning and filleting. Several problems are presented in properly and safely maintaining the fish in the water while the angler is catching additional fish to be subsequently secured to the stringer. In most instances in prior art devices with which I am familiar, it is necessary for the angler to detach temporarily the fish stringer from a position such as through the gunwale of a boat or from a staple or other fastening means secured to a dock, in order to place the newly caught fish thereon. With those particular types of present-day stringers which are adapted to be fastened and left in fastened relation with a boat or dock, provision must be made for individually securing the freshly caught fish to the stringer. Where such stringers have individual hooks disposed therealong, it is usually necessary to lift the stringer together with the fish thereon at least partially out of the water to manipulate that portion of the stringer which will receive the latest fish. It is an object of the present invention to provide a fish stringer which can be secured to the gunwale of a boat and like position with the free end thereof extending into the water and which can be utilized to receive a newly caught fish by inserting the lowermost end of the stringer into the gills or lips of a fish and without lifting the entire stringer into the boat or otherwise out of the water.

It is another object of the invention to provide a fish stringer of the class described in which a double stringing unit is furnished, the overall length of which may be shorter to prevent the outer portions thereof, together with fish strunk thereon, from extending to a dangerous position such as in contact with the propeller of an outboard motor, the capacity for holding a large number of fish being maintained.

It is a still further object of the invention to provide an efficient and inexpensive fish stringing device in which a single length of flexible line is utilized in unique combination with fastening and clamping elements so as to minimize danger of breakage and to insure the safe retention of captured fish.

These and other objects and advantages of the invention will more fully appear from the following description made in connection with the accompanying drawing, wherein like reference characters refer to the same or similar parts throughout the several views, and in which:

Fig. 1 is an elevation of my fish stringer device, portions being removed from the central area of the stringer for purpose of better illustration;

Fig. 2 is an enlarged view of the fastener element in cooperatively fastened position, a vertical section being taken through a conventional boat at the gunwale area and unessential portions of the parts being cut away; and Fig. 3 is an enlarged cross-section through the clamping and cooperative fastener element taken on the line 3—3 of Fig. 1.

With continued reference to the drawing, my invention contemplates the use of a single continuous length of flexible line 10 constructed of such material as braided plastic filament or other strong and flexible material which is capable of being easily drawn through the lips or gills of fish and which will not easily fray or break in use. The line 10 is intended to be somewhat longer than the average length of a single fish stringer and preferably shorter in doubled condition as illustrated. The flexible line 10 terminates downwardly in a pair of free ends 11 and 12 and terminates upwardly in a closed loop 13 as shown. The line 10 is preferably of such diameter as will easily be threadable through the gunwale of a boat or similar anchoring means in its doubled condition as formed at the loop 13.

Means for piercing and retaining fish on either leg at the end 11 or 12 of my stringer, are provided and each constitutes a pin 14 with a sharp point 15 and a fastening juncture 16 with an end 11 or 12 of line 10 as shown. The opposite end of pin 14 may constitute a channel 17 adapted to receive the end portion 11 of line 10 and to minimize resistance when the pin is inserted through the lips or gills of fish. After insertion through the fish in the manner stated, the pin is separated from close cooperation with the end of the line and forms a cross-abutment which will resist reverse movement of the fish and retain the last caught fish at the bottommost position on either of the stringer legs 11 or 12.

The opposite end of the entire stringer is the looped portion 13, and this looped portion is adapted to receive in attached relation a fastener element 18, and in the form shown, constituting a snap hook of conventional form.

Intermediate the looped end 13 and the free ends 11 and 12 is positioned a clamping and cooperating fastener element 19 which is preferably in the form of a sleeve clamp 19a which is crimped to the continuous line 10 at each side of the fastener element 18 to firmly hold juxtaposed positions of line 10 as shown. Secured to the clamping member and forming a part thereof is a cooperating fastening member 20 such as an eye hook which is adapted to receive the snap hook 18 to form a retaining loop for attachment to an anchoring means such as the gunwale 21 of the boat shown generally at 22 in Fig. 2.

In the use and operation of my fish stringer, the snap hook 18 together with the looped end 13 is threaded through or secured otherwise to an anchoring means such as the gunwale of boat 22, the thickness of the loop 13 and that of the snap hook 18 being such as to permit the upper end of the fish stringer to be easily inserted through the narrow space provided at the gunwale 21, The snap hook 18 is then secured to the eye hook 20 on the clamp 19 and the free ends 11 and 12 of the fish stringer are permitted to extend into the water surrounding the boat. It will be noted that the flexible line 10 is continuous and that no splicing or knots are provided which may break or become unfastened. When fish are placed upon either of the ends 11 or 12 in the manner above stated, the last caught fish will lie in abutting relation with the pin 14 when it is closed after insertion through the lips or gills of the fish. It will be further noted that the end 11 or 12 together with its piercing and retaining means, may be raised from the water permitting previously strung fish to slide upwardly toward the clamping member 19 but without removing them from the water. When the newly caught fish is placed on the end of the stringer, the other fish will arrange themselves freely over the length of the stringer but be prevented from accidental displacement as long as the pin 14 remains in its cross-abutting position. It will be further observed that despite a shorter length from the looped end 13 to the free ends 11 and 12, a large number of fish may be strung on the stringer by virtue of the double legs 11 and 12. The shorter construction of the fish stringer, however, will minimize the danger of the pins 14 or the lowermost fish from coming into contact with an outboard motor propellor or other obstruction remote from the position of attachment.

Until such time as each of the lines 10 is substantially filled with fish, the pin 14 may be slipped through the gunwale 22 so as to retain each of the flexible lines in looped condition beneath the surface of the water. When additional fish are caught, they may be then strung upon either of the lines in a one-handed operation, returning the pin to cross-abutting position through the gunwale as described. Should the pin become accidentally displaced from its temporary position, the fish will, of course, not escape but will merely slide down into abutting relation with the pins in its crossed condition.

It may thus be seen that I have devised a simple and unique fish stringer which can be readily attached to and removed from an anchoring position without lifting the entire stringer out of the water and which will adapt itself to stringing fish in a safe and secure manner to the outer ends of a pair of double strings, again without removing the entire stringer from the water and yet preserving the fish in a free but secure manner.

It will, of course, be understood that various changes may be made in the form, details, arrangement and proportions of the various parts without departing from the scope of my invention.

What I claim is:

1. A fish stringer comprising an elongated continuous flexible line constructed of strong material and capable of being drawn through the lips and gills of fish, a piercing and abutting member secured to each end of said flexible line and adapted to be inserted into the gills and lips of fish in a forward direction and abutted against the fish in a reverse direction to prevent accidental release of the fish from the stringer, a fastener element attached to said elongated continuous line at a position intermediate the ends thereof, and a clamping and cooperative fastener element securing said continuous line together in fixed grip at juxtaposed positions of said line at each side of the fastener element, whereby said fastener element may be inserted and removed together with a medial portion of said line to such anchoring means as the gunwale of a boat and fastened and unfastened to said cooperating fastener element without attention to the ends of the continuous flexible line.

2. A fish stringer comprising an elongated continuous flexible line constructed of strong material and capable of being drawn through the lips and gills of fish, a piercing and abutting member secured to each end of said flexible line and adapted to be inserted into the gills and lips of fish in a forward direction and abutted against the fish in a reverse direction to prevent accidental release of the fish, a fastener element attached to said elongated continuous line intermediate the ends thereof, a sleeve member clamped about said line at each side of the fastener element and firmly holding said flexible line in abutted relation at the clamped position, and a cooperating fastener fixed to said sleeve whereby said fastener element may be inserted and removed together with a medial portion of said line to such anchoring means as the gunwale of a boat and may be fastened and unfastened to said cooperating fastener without attention to the ends of the continuous flexible line.

3. A fish stringer comprising an elongated looped line constructed of continuous flexible material capable of being drawn through the lips and gills of fish, means for piercing and retaining fish at each end of said looped line, a fastener secured at the looped end of said stringer, and a clamp and cooperating fastener secured below said loop and above the double ends of said fish stringer whereby said fastener element may be inserted together with the looped end of said line to such anchoring means as the gunwale of a boat and may be fastened and unfastened to said cooperating fastener without attention to the double ends of the stringer.

References Cited in the file of this patent

UNITED STATES PATENTS

| 1,500,613 | Halloway | July 8, 1936 |
| 2,059,968 | Le Febvre | Nov. 3, 1936 |
| 2,517,761 | Boyer | Aug. 8, 1950 |

FOREIGN PATENTS

| 12,839 | Great Britain | May 26, 1910 |